(12) United States Patent
Sun et al.

(10) Patent No.: US 12,541,620 B2
(45) Date of Patent: Feb. 3, 2026

(54) PROMPT-BASED LANGUAGE MODELS FOR GENERATING MULTI-MODAL ELECTRONIC RECORDS

(71) Applicant: The Board of Trustees of the University of Illinois, Urbana, IL (US)

(72) Inventors: Jimeng Sun, Las Vegas, NV (US); Zifeng Wang, Urbana, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 228 days.

(21) Appl. No.: 18/218,430

(22) Filed: Jul. 5, 2023

(65) Prior Publication Data

US 2024/0045994 A1 Feb. 8, 2024

Related U.S. Application Data

(60) Provisional application No. 63/394,672, filed on Aug. 3, 2022.

(51) Int. Cl.
*G06F 21/62* (2013.01)
*G16H 10/60* (2018.01)
*G16H 50/70* (2018.01)

(52) U.S. Cl.
CPC ......... *G06F 21/6254* (2013.01); *G16H 10/60* (2018.01); *G16H 50/70* (2018.01)

(58) Field of Classification Search
CPC ..... G06F 21/6254; G16H 10/60; G16H 50/70
See application file for complete search history.

(56) References Cited

U.S. PATENT DOCUMENTS 8,650,045 B2  2/2014  Baldock
9,626,521 B2  4/2017  Gupta
(Continued)

OTHER PUBLICATIONS

Lu, Yingzhou, Lulu Chen, Yuanyuan Zhang, Minjie Shen, Huazheng Wang, Xiao Wang, Capucine van Rechem, Tianfan Fu, and Wenqi Wei, "Machine Learning for Synthetic Data Generation: A Review", Journal of Latex Class Files, vol. 14, No. 8, Aug. 2021. (Year: 2021).*

(Continued)

*Primary Examiner* — Nam T Tran
(74) *Attorney, Agent, or Firm* — McDonnell Boehnen Hulbert & Berghoff LLP

(57) ABSTRACT

An example embodiment may involve obtaining text-based, ground truth electronic health records (EHRs), wherein the ground truth EHRs specify a sequence of medical visits involving a plurality of modalities, and wherein each of the medical visits specifies tokens representing at least one of the modalities; generating a training data set by perturbing the ground truth EHRs, wherein perturbing the ground truth EHRs involves deleting or shuffling some of the tokens in the ground truth EHRs; and iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, and (iii) a loss function that compares the predicted EHRs to their corresponding ground truth EHRs.

20 Claims, 19 Drawing Sheets

(56) References Cited

U.S. PATENT DOCUMENTS

| | | | |
|---|---|---|---|
| 10,014,080 | B2 | 7/2018 | Ashparie |
| 10,482,556 | B2 | 11/2019 | Yao |
| 11,532,397 | B2 | 12/2022 | Lucas |
| 2011/0145013 | A1 | 6/2011 | McLaughlin |
| 2013/0332194 | A1 | 12/2013 | D'Auria |
| 2015/0304101 | A1* | 10/2015 | Gupta .............. G06F 21/606 380/28 |
| 2016/0162638 | A1 | 6/2016 | Albro |
| 2017/0103232 | A1* | 4/2017 | Scaiano ............ G16H 10/60 |
| 2019/0304582 | A1 | 10/2019 | Blumenthal |
| 2020/0202987 | A1* | 6/2020 | Graham ............ G16H 10/60 |
| 2020/0350072 | A1 | 11/2020 | Mcewing |
| 2022/0036981 | A1* | 2/2022 | Min .................. G06F 21/6245 |
| 2022/0293272 | A1* | 9/2022 | Pang ................. G16H 50/70 |

OTHER PUBLICATIONS

Wang, Zifeng and Jimeng Sun, "PromptEHR: Conditional Electronic Healthcare Records Generation with Prompt Learning", Proc Conf Empir Methods Nat Lang Process. Dec. 2022. (Year: 2022).*
Amin-Nejad. 2020. Exploring transformer text generation for medical dataset augmentation. In Language Resources and Evaluation Conference. 4699-4708.
Arjovsky. 2017. Wasserstein generative adversarial networks. In International Conference on Machine Learning. PMLR, 214-223.
Baowaly. 2019. Synthesizing electronic health records using improved generative adversarial networks. Journal of the American Medical Informatics Association 26, 3 (2019), 228-241.
Biswal, EVA: Generating Longitudinal Electronic Health Records Using Conditional Variational Autoencoders, https://doi.org/10.48550/arXiv.2012.10020, Dec. 18, 2020.
Brown, Language Models are Few-Shot Learners, Advances in Neural Information Processing Systems 33 (NeurIPS 2020).
Buczak, A.L., Babin, S. & Moniz, L. Data-driven approach for creating synthetic electronic medical records. BMC Med Inform Decis Mak 10, 59 (2010). https://doi.org/10.1186/1472-6947-10-59.
Choi, E., Bahadori, M.T., Schuetz, A., Stewart, W.F. & Sun, J.. (2016). Doctor AI: Predicting Clinical Events via Recurrent Neural Networks. Proceedings of the 1st Machine Learning for Healthcare Conference, in Proceedings of Machine Learning Research 56:301-318 Available from https://proceedings.mlr.press/v56/Choi16.html.
Choi, E., Biswal, S., Malin, B., Duke, J., Stewart, W.F. & Sun, J.. (2017). Generating Multi-label Discrete Patient Records using Generative Adversarial Networks. Proceedings of the 2nd Machine Learning for Healthcare Conference, in Proceedings of Machine Learning Research 68:286-305 Available from https://proceedings.mlr.press/v68/choi17a.html.
Choi, Generating Multi-label Discrete Patient Records using Generative Adversarial Networks, https://doi.org/10.48550/arXiv.1703.06490, Jan. 11, 2018.
Choi, RETAIN: An Interpretable Predictive Model for Healthcare using Reverse Time Attention Mechanism, https://doi.org/10.48550/arXiv.1608.05745, Feb. 26, 2017.
Cui, L., Biswal, S., Glass, L. M., Lever, G., Sun, J., & Xiao, C. (2020). CONAN: Complementary Pattern Augmentation for Rare Disease Detection. Proceedings of the AAAI Conference on Artificial Intelligence, 34(01), 614-621. https://doi.org/10.1609/aaai.v34i01.5401.
Devlin. 2019. BERT: Pre-training of Deep Bidirectional Transformers for Language Understanding. In Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics.
El Emam K, Jonker E, Arbuckle L, Malin B (2015) Correction: A Systematic Review of Re-Identification Attacks on Health Data. PLOS One 10(4): e0126772. https://doi.org/10.1371/journal.pone.0126772.
El Emam K, Rodgers S, Malin B. Anonymising and sharing individual patient data. BMJ. Mar. 2, 20150;350:h1139. doi: 10.1136/bmj.h1139. PMID: 25794882; PMCID: PMC4707567.
Fan. 2018. Hierarchical Neural Story Generation. In Proceedings of the 56th Annual Meeting of the Association for Computational Linguistics (vol. 1: Long Papers), pp. 889-898, Melbourne, Australia. Association for Computational Linguistics.
Goodfellow, Generative Adversarial Nets, Advances in Neural Information Processing Systems 27 (NIPS 2014).
Guan, 2018. Generation of Synthetic Electronic Medical Record Text. In IEEE International Conference on Bioinformatics and Biomedicine (BIBM). IEEE Computer Society, 374-380.
Gulrajani. 2017. Improved training of Wasserstein GANs. In International Conference on Neural Information Processing Systems. 5769-5779.
Holtzman. 2019. The Curious Case of Neural Text Degeneration. In International Conference on Learning Representations.
Huang. 2020. ClinicalBERT: Modeling clinical notes and predicting hospital readmission. In Conference on Health, Inference, and Learning.
Johnson. 2016. MIMIC-III, a freely accessible critical care database. Scientific Data 3, 1 (2016), 1-9.
Kagawa. 2021. A practical and universal framework for generating publicly available medical notes of authentic quality via the power of crowds. In IEEE International Conference on Big Data. IEEE, 3534-3543.
Kingma. 2013. Auto-encoding variational bayes. arXiv preprint arXiv:1312.6114 (2013).
Kingma. 2014. Adam: A method for stochastic optimization. arXiv preprint arXiv:1412.6980 (2014).
Lee. 2020. Generating sequential electronic health records using dual adversarial autoencoder. Journal of the American Medical Informatics Association 27, 9 (2020), 1411-1419.
Lewis. 2020. BART: Denoising Sequence-to-Sequence Pre-training for Natural Language Generation, Translation, and Comprehension. In Annual Meeting of the Association for Computational Linguistics. 7871-7880.
Libbi. 2021. Generating Synthetic Training Data for Supervised De-Identification of Electronic Health Records. Future Internet 13, 5 (2021), 136.
Liu. 2021. Swin transformer: Hierarchical vision transformer using shifted windows. arXiv preprint arXiv:2103.14030 (2021).
Lombardo. 2008. A Method for Generation and Distribution of Synthetic Medical Record Data for Evaluation of Disease-Monitoring Systems. Johns Hopkins APL Technical Digest 27, 4 (2008), 356.
McLachlan. 2016. Using the caremap with health incidents statistics for generating the realistic synthetic electronic healthcare record. In IEEE International Conference on Healthcare Informatics. IEEE, 439-448.
Neubig. 2017. Neural machine translation and sequence-to-sequence models: A tutorial. arXiv preprint arXiv:1703.01619 (2017).
Radford, Alec et al. "Language Models are Unsupervised Multitask Learners." (2019).
Radford. 2021. Learning transferable visual models from natural language supervision. arXiv preprint arXiv:2103.00020 (2021).
Raffel. 2020. Exploring the Limits of Transfer Learning with a Unified Text-to-Text Transformer. Journal of Machine Learning Research 21, 140 (2020), 1-67. http://jmlr.org/papers/v21/20-074.html.
Saxena. 2021. Generative adversarial networks (GANs) challenges, solutions, and future directions. ACM Computing Surveys (CSUR) 54, 3 (2021), 1-42.
Sep. 1997. Long short-term memory. Neural Computation 9, 8 (1997), 1735-1780.
Shokri. 2017. Membership inference attacks against machine learning models. In IEEE Symposium on Security and Privacy. IEEE, 3-18.
Vaswani. 2017. Attention is all you need. In Advances in Neural Information Processing Systems. 5998-6008.
Wang. 2021. Lifelong Learning Based Disease Diagnosis on Clinical Notes. In Pacific-Asia Conference on Knowledge Discovery and Data Mining. Springer, 213-224.

(56) References Cited

OTHER PUBLICATIONS

Wang. 2021. Online Disease Diagnosis with Inductive Heterogeneous Graph Convolutional Networks. In Proceedings of the Web Conference 2021. 3349-3358.
Welleck. 2019. Neural Text Generation With Unlikelihood Training. In International Conference on Learning Representations.
Xu, Modeling Tabular data using Conditional GAN, Advances in Neural Information Processing Systems 32 (NeurIPS 2019).
Zhang Z, Yan C, Lasko TA, Sun J, Malin BA. SynTEG: a framework for temporal structured electronic health data simulation. J Am Med Inform Assoc. Mar. 1, 2021;28(3):596-604. doi: 10.1093/jamia/ocaa262. PMID: 33277896; PMCID: PMC7936402.
Zhang. 2020. Ensuring electronic medical record simulation through better training, modeling, and evaluation. Journal of the American Medical Informatics Association 27, 1 (2020), 99-108.
Zhu, Detecting GAN generated errors, https://doi.org/10.48550/arXiv.1912.00527, Dec. 2, 2019.

* cited by examiner

| Item | Number | Code Type | Number |
|---|---|---|---|
| Patients | 46,520 | Diagnosis | 1,071 |
| Total Visits | 58,976 | Drug | 500 |
| Total Codes | 5,401,961 | Procedure | 668 |
| Codes per Patient | 116 | Lab Test | 185 |

FIG. 6

| Method/Code perplexity | Diagnosis | | Procedure | | Drug | | Lab Test | |
| --- | --- | --- | --- | --- | --- | --- | --- | --- |
| | lpl | mpl | lpl | mpl | lpl | mpl | lpl | mpl |
| LSTM+MLP | 125.1 ± 5.3 | 122.9 ± 2.0 | 40.3 ± 1.7 | 43.8 ± 0.9 | 173.3 ± 1.9 | 169.5 ± 0.5 | 68.9 ± 0.3 | 71.3 ± 0.5 |
| LSTM+MedGAN | 169.2 ± 6.0 | 109.8 ± 3.1 | 54.4 ± 2.5 | 40.1 ± 1.4 | 197.3 ± 2.5 | 166.7 ± 0.9 | 76.9 ± 0.3 | 66.2 ± 0.2 |
| SynTEG | 130.4 ± 4.6 | 130.0 ± 2.6 | 46.4 ± 1.8 | 46.2 ± 1.5 | 175.6 ± 2.0 | 175.4 ± 0.9 | 69.5 ± 0.2 | 69.6 ± 0.3 |
| GPT-2 | 121.1 ± 1.8 | 134.2 ± 0.9 | 38.7 ± 0.9 | 48.2 ± 0.5 | 166.4 ± 1.8 | 169.6 ± 0.6 | 69.7 ± 0.1 | 69.6 ± 0.1 |
| PromptEHR | 65.9 ± 2.0 | 67.7 ± 0.6 | 13.5 ± 0.8 | 10.1 ± 0.3 | 104.7 ± 1.8 | 93.7 ± 0.5 | 24.4 ± 0.1 | 50.1 ± 0.1 |

FIG. 7

(a) The ROC curve of the membership inference attack by shadow training.

(b) The true positive rate (TPR) and false positive rate (FPR) of the attribute inference attack w.r.t. different thresholds $\delta$.

| | |
|---|---|
| visit-1 | diagnosis: Liveborn<br>labtest: Hematocrit<br>procedure: Prophylactic vaccination |
| visit-2 | diagnosis: Streptococcus infection, Extreme immaturity, Perinatal infection, Neonatal jaundice, Liveborn<br>labtest: Anion Gap, Bands, Base Excess, Bilirubin, Total, Chloride, Eosinophils, Hematocrit, Hemoglobin, Lymphocytes, MCH, MCHC, MCV, Monocytes, Platelet Count, Potassium, Red Blood Cells, Sodium, $pCO_2$, pH, $pO_2$<br>drug: Ampicillin Sodium, Heparin Sodium (Preservative Free), NEO*IV*Gentamicin, NEO*PO*Ferrous Sulfate Elixir, Send 500mg Vial, Syringe (Neonatal) *D5W*<br>procedure: Biopsy of spinal cord |

FIG. 13

| | |
|---|---|
| visit-1 | diagnosis: Pneumonia, Hematemesis, Heart failure, Emphysema<br>labtest: Leukocytes, Urea Nitrogen, Calcium, Ketone<br>procedure: Enteral infusion of nutrition, Insertion of airway, Replace tracheostomy tube, Temporary tracheostomy |
| visit-2 | diagnosis: Heart failure, Respiratory conditions, Tracheostomy status, Stomach disorder<br>labtest: Urine Appearance, Yeast, Platelet Count, Calculated Total CO2<br>procedure: Biopsy of bronchus, Replace gastrostomy tube, Invasive mechanical ventilation, Infusion of nesiritide |
| visit-3 | diagnosis: Pneumonia, Mechanical complication, Pulmonary manifestations, Disorders of urinary tract<br>labtest: INR(PT), Epithelial Cells, RBC, Urine Appearance<br>procedure: Insertion of airway, Enterostomy, Lysis of peritoneal adhesions, Lung biopsy |
| visit-4 | diagnosis: Mechanical complication, Hodgkin's paragranuloma, Pressure ulcer, Heart failure<br>labtest: Urine Color, Urobilinogen, Bands, Urea Nitrogen<br>procedure: Infusion of nesiritide, Endoscopy of small intestine, Gastrostomy, Replace tracheostomy tube |
| visit-5 | diagnosis: Urethra disorder, Attention to tracheostomy/gastrostomy, Pneumonia, Heart failure<br>labtest: MCH, Bacteria, Lymphocytes, Calculated Total CO2<br>drug: Fluticasone Propionate 110mcg, SW, Bisacodyl, Iso-Osmotic Dextrose<br>procedure: Replace tracheostomy tube, Heart cardiac catheterization, Enteral infusion of nutrition |
| visit-6 | diagnosis: Pneumonia, Heart failure, Endomyocardial fibrosis, Mechanical complication<br>labtest: pH, Epithelial Cells, WBC, Protein<br>drug: Neutra-Phos, Mirtazapine, Fluconazole, SW<br>procedure: Invasive mechanical ventilation, Airway infusion, Monitoring of cardiac output, Lung biopsy |

FIG. 14

PROMPT-BASED LANGUAGE MODELS FOR GENERATING MULTI-MODAL ELECTRONIC RECORDS

CROSS-REFERENCE TO RELATED APPLICATION

This application claims priority to U.S. provisional patent application No. 63/394,672, filed Aug. 3, 2022, which is hereby incorporated by reference in its entirety.

BACKGROUND

Electronic records, such as electronic healthcare records (EHRs) fuel the development of machine learning models for healthcare applications. However, medical institutions are often reluctant to share EHRs with the research community due to privacy concerns. Therefore, sharing EHR data usually undergoes strict and cumbersome de-identification and administration processes. Although there have been attempts relating to perturbing potentially identifiable attributes as the de-identification step, they are not immune to hacking for re-identification.

SUMMARY

The embodiments herein involve generating synthetic but realistic EHRs that can circumvent data leakage while preserving the patterns of real EHRs for further research and development. Existing methods for synthetic EHR generation are limited to single-modal EHRs by employing unconditional generation or longitudinal inference. But these efforts exhibit low flexibility and result in unrealistic EHRs.

As an alternative, the embodiments herein formulate EHR generation as a text-to-text translation task by language models (LMs) based on prompt-based learning (referred to herein as PromptEHR). This paradigm not only leverages the power of LMs but also allows flexibility in conditional imputation for multi-modal EHRs, which yields more realistic synthetic EHRs. Synthetic EHR quality is evaluated by two perplexity measures accounting for their longitudinal pattern (longitudinal imputation perplexity, lpl) and the connections across modalities (cross-modality imputation perplexity, mpl). Moreover, two adversarial approaches are used: membership and attribute inference attacks for privacy-preserving evaluation. Experiments on MIMIC-III data demonstrate the superiority of these methods for realistic EHR generation (53.1% decrease of lpl and 45.3% decrease of mpl on average compared to the best baselines) with low privacy concerns.

Accordingly, an example embodiment may involve obtaining text-based, ground truth EHRs, wherein the ground truth EHRs specify a sequence of medical visits involving a plurality of modalities, and wherein each of the medical visits specifies tokens representing at least one of the modalities; generating a training data set by perturbing the ground truth EHRs, wherein perturbing the ground truth EHRs involves deleting or shuffling some of the tokens in the ground truth EHRs; iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, (iii) a loss function that compares the predicted EHRs to their corresponding ground truth EHRs, and (iv) an updating function that updates the bidirectional language model encoder or the autoregressive language model decoder based on output of the loss function; and, in response to completion of the machine learning trainer application, providing the bidirectional language model encoder and the autoregressive language model decoder as a generative model that can produce synthetic EHRs based on input EHRs provided thereto.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 provides statistics of the training data, in accordance with example embodiments.

FIG. 7 depicts longitudinal imputation perplexity and cross-modality imputation perplexity of various models, in accordance with example embodiments.

FIG. 13 is an EHR generated from scratch, in accordance with example embodiments.

FIG. 14 is a synthetic EHR generated based on a real EHR, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

Figure 1:
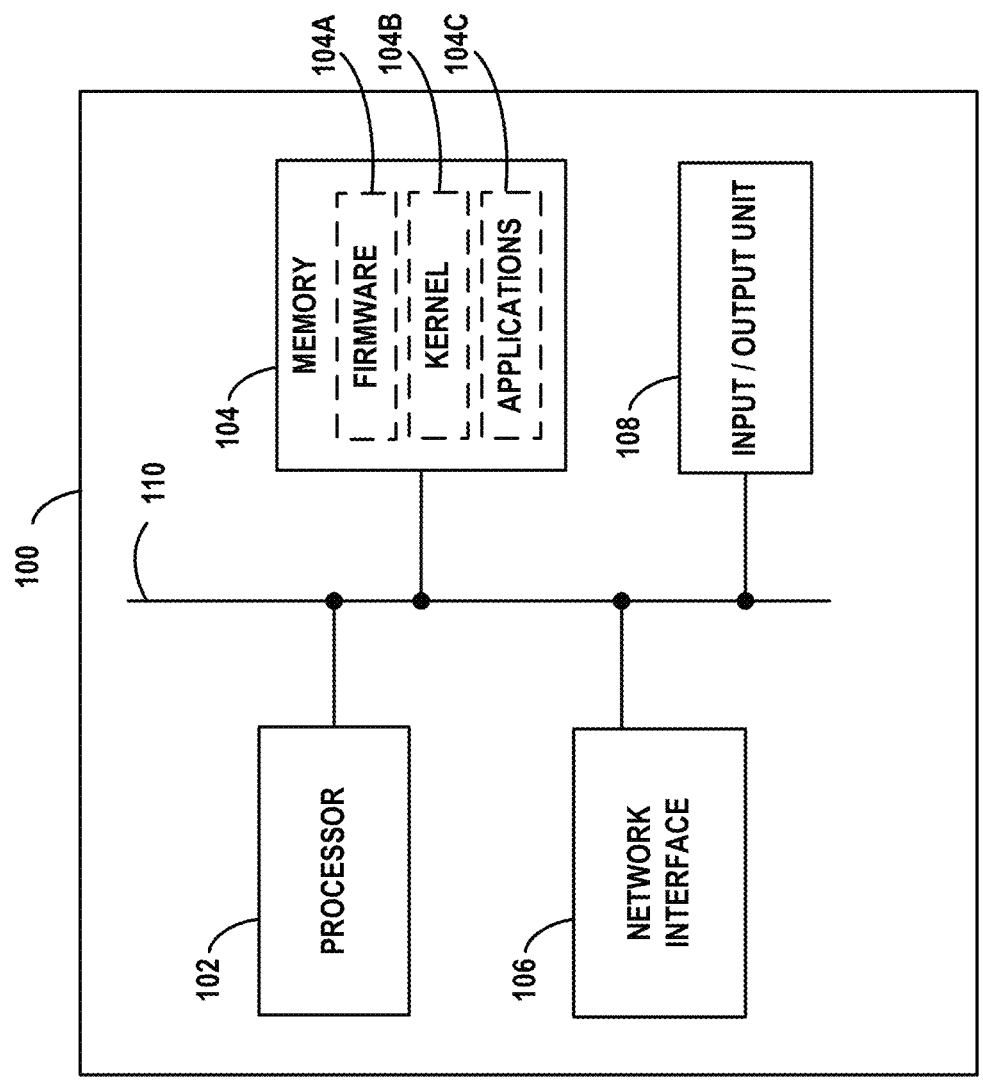
FIG. 1 depicts a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries (e.g., scheduling algorithms and/or random number generators) used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media. Network interface 106 may additionally take the form of one or more wireless interfaces, such as IEEE 802.11 (Wife), BLUETOOTH®, global positioning system (GPS), or a wide-area wireless interface (e.g., LTE-based 4G or MIMO-based 5G). However, other forms of physical layer interfaces and other types of standard or proprietary communication protocols may be used over network interface 106. Furthermore, network interface 106 may comprise multiple physical interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

To the end of distributing the embodiments herein beyond a single computing device, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
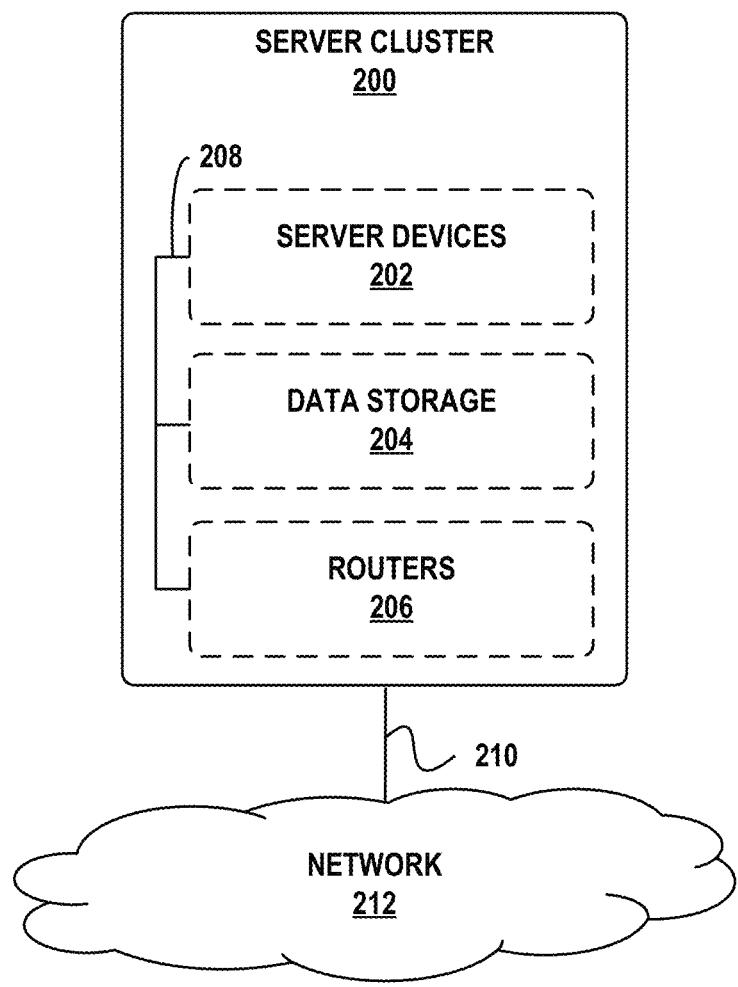
FIG. 2 depicts a cloud-based computing infrastructure, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

Additionally, server devices 202 may be configured to carry out various types of machine learning training and/or execution tasks, such as those described below. Thus, server devices 202 may be able to train various types of machine learning models with corpuses of data, as well as execute these models on new observations made in live operation of a wireless system.

II. Example Neural Networks

This section provides an illustrative overview of neural networks in general. Such an overview may be helpful in appreciating the improvements provided by these embodiments.

A neural network is a computational model in which a number of simple units, working individually in parallel and often without central control, combine to solve complex problems. While this model may resemble an animal's brain in some respects, analogies between neural networks and brains are tenuous at best. Modern neural networks have a fixed structure, a mathematical learning process, are usually trained to solve one problem at a time, and are much smaller than their biological counterparts.

A neural network is represented as a number of nodes that are arranged into a number of layers, with connections between the nodes of adjacent layers. The description herein generally applies to a feed-forward multilayer neural network, but similar structures and principles are used in convolutional neural networks, recurrent neural networks, graph neural networks, and recursive neural networks, for example.

Input values are introduced to the first layer of the neural network (the input layer), traverse some number of hidden layers, and then traverse an output layer that provides output values. A neural network may be a fully-connected network, in that nodes of each layer aside from the input layer receive input from all nodes in the previous layer. But partial connectivity between layers is also possible.

Connections between nodes represent paths through which intermediate values flow, and are each associated with a respective weight that is applied to the respective intermediate value. Each node performs an operation on its received values and their associated weights (e.g., values between 0 and 1, inclusive) to produce an output value. In some cases this operation may involve a dot-product sum of the products of each input value and associated weight. An activation function (e.g., a sigmoid, tanh or ReLU function) may be applied to the result of the dot-product sum to produce a scaled output value. Other operations are possible Training a neural network usually involves providing the neural network with some form of supervisory training data, namely sets of input values and desired, or ground truth, output values. The training process involves applying the input values from such a set to the neural network and producing associated output values. A loss function is used to evaluate the error between the produced output values and the ground truth output values. This loss function may be a sum of differences, mean squared error, or some other metric. In some cases, error values are determined for all of the sets of input values, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through the neural network in a fashion that results in a lower error for future iterations of the training data.

The training process continues applying the training data to the neural network until the weights converge. Convergence occurs when the error is less than a threshold value or the change in the error is sufficiently small between consecutive iterations of training. At this point, the neural network is said to be "trained" and can be applied to new sets of input values in order to predict output values that are unknown.

Most training techniques for the neural network make use of some form of backpropagation. Backpropagation distributes the error one layer at a time, from the output layer, through the hidden layers and to the input layer. Thus, the weights of the connections between the last hidden layer and the output layer are updated first, the weights of the connections between second-to-last hidden layer and last hidden layer are updated second, and so on. This updating can be based on a partial derivative of the activation function for each node and that node's connectivity to other nodes. Backpropagation completes when all weights have been updated.

In some cases, various hyperparameters can be used to adjust the learning of the neural network. For example, constant biases can be applied to the dot-product sums on a per layer basis. Further, a multiplicative learning rate, or gain, could be applied when weights are updated. Other possibilities exist.

Once trained, the neural network can be given new input values and produce corresponding output values that reflect what the neural network has learned by way of training. These output values may be predictions or classifications of the input values.

While the discussion above assumes supervised training, training processes can also be unsupervised. For instance, given a corpus of data, a neural network can learn mappings from this data to real-valued vectors in such a way that resulting vectors are similar for data with similar content. This can be achieved using, for example, auto-encoders that reconstruct the original vector from a smaller representation with reconstruction error as a cost function. This process creates meaningful representations that can be used for interpretability, for example.

A further type of model that may be employed herein is a generative adversarial network (GAN). GANs involve two neural networks that train one another so that they can generate data sets that are statistically similar to their training data.

III. Generating EHRs

Deep generative models like generative adversarial networks (GANs) and variational auto-encoders (VAEs) have become popular for unconditional EHR generation and longitudinal EHR generation for a single type of event, such as diagnosis codes. Such processes are illustrated by steps (1) and (2) of FIG. 3. In this figure, the leaf nodes (endpoints) are targets to infer and the non-leaf nodes are known events ("Diag" and "Prod" are short for diagnosis and procedure codes, respectively).

However, EHRs are often multi-modal with different types of events, including diagnoses, procedures, medications, lab tests, and more. Due to the limited representation capacity and flexibility, it is challenging to leverage GANs and VAEs for complex multi-modal data generation. A promising alternative is the transformer-based language model (LM), which has been proved powerful for learning from multi-modal data. However, unlike texts and images, EHRs contain structured and multi-modal sequences in time order, which render the direct applications of LMs infeasible.

The embodiments herein leverage prompt-based learning to adapt the EHR generation task to a text generation task based on Bidirectional and Auto-Regressive Transformers (BART). This is referred to herein as prompt-based learning for EHRs generation (PromptEHR). These techniques allow for flexibility in data generation attributing to the prompt-based learning, as shown by steps (3)-(7) of FIG. 3. Notably, PromptEHR executes the missing modality imputation (3) that infers the occurred procedures given the diagnoses in a visit; as well as missing event completion (4). It can also infer the diagnoses in the next visit conditioned on the previous heterogeneous events (5) or the diagnoses in the current visit (6). Reverse imputation is also feasible where the missing procedures in the first visit are inferred based on all other events (7). Moreover, PromptEHR is amenable to more imputation tasks if new prompts for the generation are developed. This flexibility allows the full utilization of real EHRs for synthetic EHRs generation: arbitrary corruption can be applied to the raw EHRs, then execute appropriate imputation methods to generate diverse and realistic synthetic EHRs.

The contribution of these techniques include, but are not limited to: (i) EHR-BART as a system that enables BART for both longitudinal and missing modality conditional generation of heterogeneous EHRs by prompt-based learning, (ii) a systematic evaluation framework for quality and privacy of the generated synthetic records by LMs, and (iii) extensive experiments that demonstrate the usefulness and safety of the synthetic EHRs for DL-based predictive healthcare applications. As a result, these techniques have notable differences from and improvements over other EHR generation frameworks.

Early work relating to generating EHRs tried rule-based methods. However, they were not capable of providing sufficiently realistic data for machine learning tasks and were still vulnerable to re-identification. On the other hand, deep generative models advanced by the power of deep learning, e.g., VAEs and GANs, gained attention from researchers recently. However, the majority of the proposed methods only generate homogeneous EHRs and fall short in only being capable of longitudinal conditional generation. Also, GANs are well known to be often riddled with problems like mode collapse, non-convergence, and instability, which cause training to be difficult in practice.

LMs thrived in the natural language processing (NLP) field with the emergence of Bidirectional Encoder Representations from Transformers (BERT), GPT-2 (as well as newer versions of GPT) and so on. They encouraged a shift from the fully supervised learning to the use of pre-training and fine-tuning in NLP practice. Left-to-right (L2R) LMs, as one of the major types of LMs, were commonly adopted for text generation tasks attributed to their auto-regressive nature. Nonetheless, they cannot be directly applied to EHR generation since EHRs consist of not only plain clinical notes but also other forms of longitudinal sequences of events like lab tests, diagnosis codes, visit sequences, etc. Moreover, LMs learned from general corpus like Wikipedia are unable to provide sufficient representation of clinical data, making it imperative to include extra domain-specific corpuses. Although there has been work on generating medical texts by LMs, synthetic EHR generation using LMs is believe to be new in these embodiment.

IV. PromptEHR Framework

This section elaborates on the main framework of PromptEHR, including the problem setting, workflow, and training tasks formulation. Next, the strategies for generating diverse synthetic EHRs with minor loss of quality are discussed. Then, the recipe proposed for the evaluation for both quality and privacy-preserving ability of the EHR generation models is presented.

A. Problem Formulation

Figure 4:
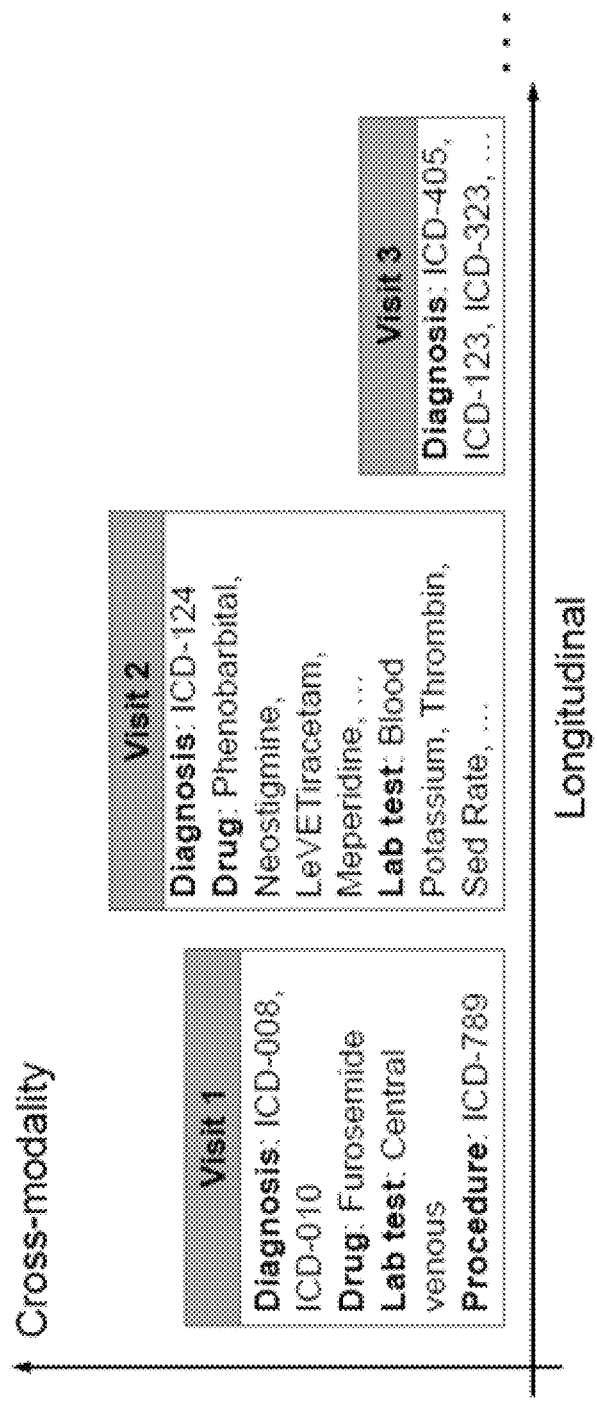
FIG. 4 depicts a longitudinal EHR, in accordance with example embodiments.

An example patient record is depicted in FIG. 4. This record is longitudinal and multi-modal. To formalize the problem of synthesizing patient records, it is assumed that there are N patients in total, where the nth patient record is represented by:

$$X_{n,1:T_n} = \{x_{n,1}, x_{n,2}, \ldots, x_{n,T_n}\}$$

Here, $T_n$ represents the number of visits; thus, $x_{n,t}$ is the record of a patient's tth visit. It is also assumed that there are K modalities such that:

$$x_{n,t} = \{x_{n,t}^1, x_{n,t}^2, \ldots, x_{n,t}^K\}$$

The variable $x_{n,t}^k$ indicates the codes from the kth modality that appear in the patient's tth visit. Therefore:

$$x_{n,t}^k = \{v_1, v_2, \ldots, v_l\}$$

Where $v_i \in V_k$ represents an individual code.

Figure 3:
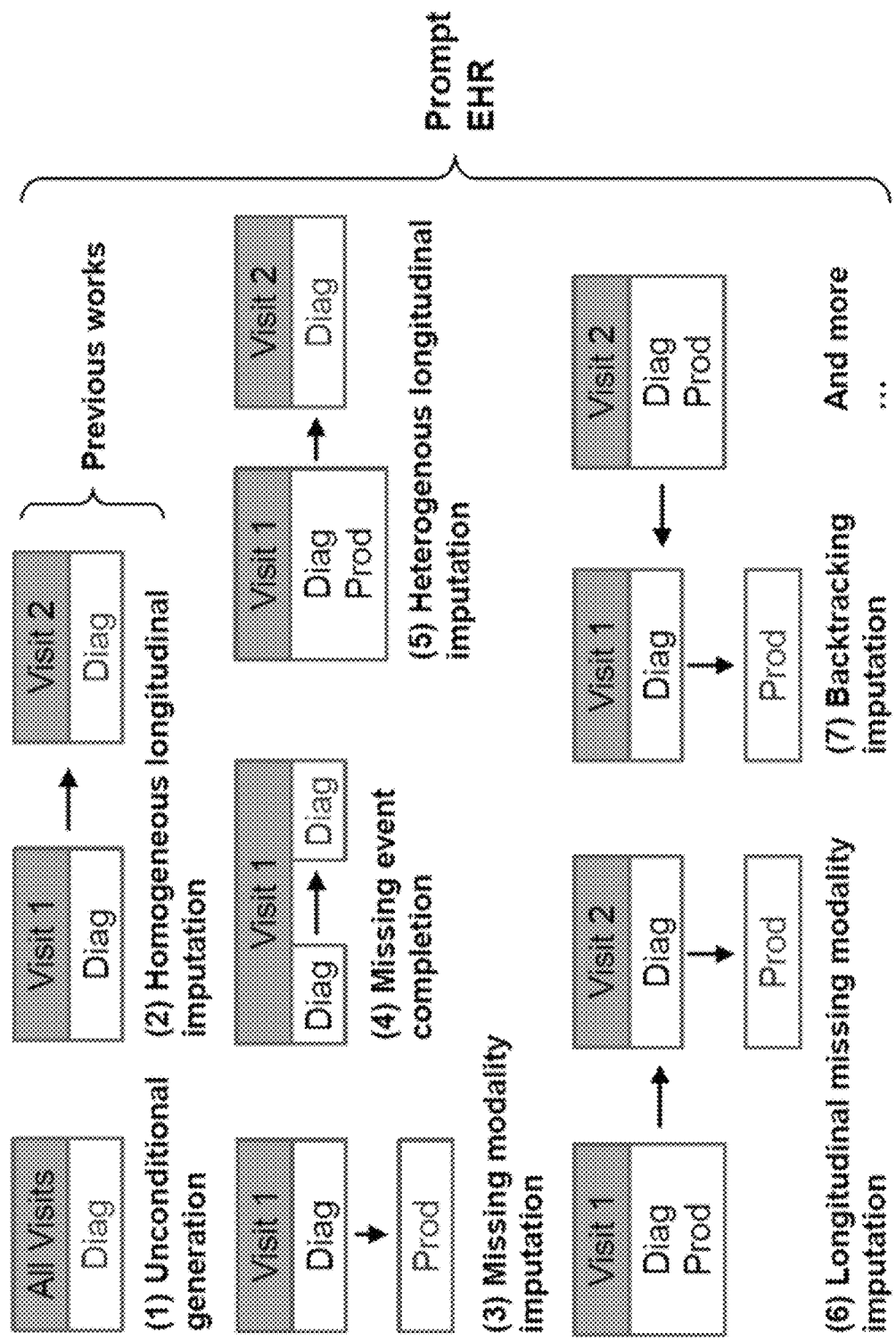
FIG. 3 depicts techniques for EHR generation, in accordance with example embodiments.

Without loss of generality, the longitudinal imputation tasks (steps (2) and (5) shown in FIG. 3) and the missing modality imputation tasks (steps (3) and (6) in FIG. 3) are formulated as follows. Other imputation tasks can be formulated similarly. For the longitudinal prediction, a list of historical records $X_{1:t}$ of a patient are given as:

$$X_{n,1:t} = \{x_{n,1}, z_{n,2}, \ldots, x_{n,t}\}$$

The model should predict when will happen during the patient's next visit as $x_{n,t+1}$. For the cross-modality prediction, the model should predict a missing modality $x_{n,t}^k$ conditioned on all the existing modalities $x_{n,t} \supset \{x_{n,t}^k\}$. Notably, there can be more than one missing modality.

These two functions can be leveraged to synthesize EHRs conditioned on patient records or from scratch. For instance, given $x_{n,1}^1$, the model first undertakes missing modality imputation to fill all modalities in this admission to get $x_{n,1}$. Then, the model makes longitudinal predictions to obtain $x_{n,2}$ and so on. Or, several modalities can be randomly removed in each visit and iterative missing modality imputation and longitudinal imputation can be used to generate diverse synthetic and realistic EHRs.

B. Model Architecture

Language models based on transformers take a sequence of tokens as their inputs. To build the inputs based on multi-modal codes, prompts are used. In detail, special tokens are introduced to specify the input modality and the predicted modality. Without loss of generality, it is assumed that there are two modalities in the data: diagnosis and drug. Two special tokens<diag> and <drug> are used to represent these modalities. Denote [X] and [Z] as the input and answer slots, respectively. Then, the missing modality prediction for the diagnosis codes can be formulates as a doze prompt problem: [X]<diag>[Z] [X].

The input slot [X] can contain the codes in historical visits and the drug codes in this admission. On the other hand, <eos> is used to divide codes from different admissions. This makes the longitudinal prediction a prefix prompt problem: [X]<eos>[Z]. The answer slot [Z] can be further started by <diag> and <drug> for making generation separately. All the answer slots [Z] are covered by a special mask token<mask> during training.

Similarly, to do missing event completion, a part of diagnosis codes can be removed to build the answer for the prompt, as <diag> [X] [Z]</diag>. To do backtracking imputation, the answer slot can be put before <eos> as [Z]<eos> [X]. The prompt-based learning with BART offers significant flexibility to build imputation tasks for synthesizing EHRs.

Figure 5:
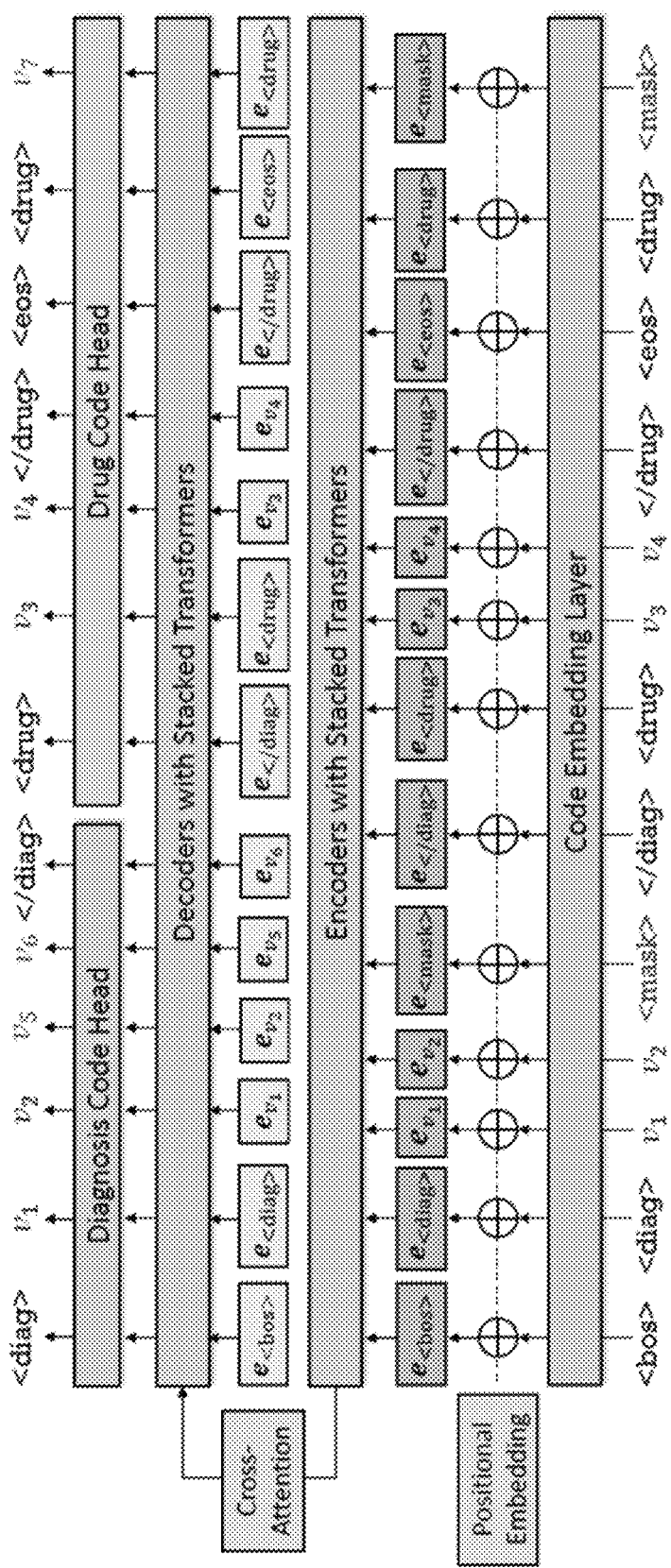
FIG. 5 depicts an overview of the PromptEHR workflow, in accordance with example embodiments.

FIG. 5 plots the overview flowchart of PromptEHR. The inputs at the bottom of the figure represent a patient's admission where there are two kinds of codes: diagnosis (<diag>) and drug (<drug>). The tasks are to fill the <mask> inside this admission and in the next admission. Raw inputs are encoded by the general code embedding layer then added with positional embeddings. The obtained input embeddings then go into the encoders, which are used for building the cross-attention towards the decoders later. The decoders try to recover the original inputs by a left-to-right paradigm. Specifically, two heads are responsible for generating two codes, respectively. When met with the prompts of modality, e.g., <drug>, the decoders switch to the specific head for code generation.

C. Training

PromptEHR is trained to recover the visit sequences given the corrupted inputs, supervised by the cross-entropy between the decoded sequence of codes and the ground truth visits. Since a bidirectional encoder is used, any corruption techniques can be applied to the inputs. The supervision is based on the combination of the following corruptions.

Code Mask, Infill, and Deletion: Using token-level transformations, codes are randomly sampled and replaced them with <mask> or deleted. For infilling, a span of codes with length sampled as length~Poisson(3) are replaced with a single <mask>.

Span Shuffle and Permutation: Unlike natural language, the codes of EHRs inside a span and different modalities inside a visit are concurrent thus not ordered. The codes are shuffled within the same span to remove the model's dependency on their orders. Similarly, the span's order is shuffled within the same admission to remove the modalities' orders in the inputs.

Longitudinal and Missing Modality Imputation: In each training iteration, one of the modalities is randomly masked and the model recovers it based on the remaining modalities. The longitudinal imputation requires the model to recover a modality in the next admission by the patient's historical visits.

Denote the context by X and the target event by x. The true distribution over the context X in the EHRs is denoted by p(x|X). For instance, for the longitudinal inference task, the context is the historical record of the patient $X_{1:t}$ and the target would be the events in the next visit $x_{t+1}$, as described above. Correspondingly, p(x|; θ) is the prediction made by the model. The term $\tilde{X} \sim q(X)$ is used to represent the stochastic perturbations added to the context, as mentioned above. The training objective is hence to minimize the negative log-likelihood as:

$$\mathcal{L} = \mathbb{E}_{x \sim p(x)} \mathbb{E}_{\tilde{x} \sim p(x|X)} \mathbb{E}_{\tilde{x} \sim q(x)}[-\log p(x|\tilde{X}; \theta)] \quad (1)$$

D. Introduction of Harmless Randomness

Apart from preciseness, the diversity of the generated data is also of great importance. Previous GAN and VAE based methods try to introduce randomness by sampling from a noise vector which is combined with another state vector as the inputs. This strategy follows the practice in deep generative models for image and video generation. However, images are insensitive to perturbation, e.g., high adversarial noises can be injected into many pixels in an image without changing the determination of human eyes. By contrast, it is challenging to adjust the degree of noises injected into the EHRs representations to balance the randomness and the quality: inappropriate noises may significantly vary the model predictions thus changing the generated events dramatically, which often causes low-quality synthetic EHRs.

Fortunately, with the PromptEHR framework, a rather harmless randomness can be introduced during the generation process. One major advantage of PromptEHR is that randomly corrupted real EHRs can be used for synthesizing by a series of imputations discussed before (see, e.g., FIG. 3). On the other hand, stochastic sampling can be used for single code generation. Recall that LMs do event prediction by maximizing the conditional distribution:

$$\operatorname{argmax}_{x_t} P(x_t | x_{1:t-1}; \theta) \quad (2)$$

Therefore, the sampled events still have high probability to be correct. Moreover, to prevent the generation of low probability events, top-k sampling can be applied to only sample from the k mostly likely next events. Besides, temperature can be used to make the softmax distribution $P(x_t|x_{1:t-1}; \theta)$ flatter or sharper to adjust the degree of randomness. More advanced strategies from the text generation literature, e.g., beam search and nucleus sampling, are all available for exploitation in PromptEHR, which brings great potential for PromptEHR to achieve a better trade-off between generation quality and diversity.

E. Quality Evaluation

This subsection provides a recipe to evaluate LMs on two dimensions: accuracy and privacy. For accuracy, perplexity has been adopted, which is usually used in the text generation task defined by the exponent of the average negative log-likelihood (NLL) per word:

$$ppl = e^{-(\log P(v_1, v_2, \ldots v_L; \theta))/L} = e^{-\left(\log \prod_{l=1}^{L} P(v_l | v_{1:l-1}; \theta)\right)/L} \quad (3)$$

Where $P(v_1|v_{1:l-1})$ indicates how the model predicts the next word using all previous words as the context; L is the length of the document; and $\theta$ is the model parameter. Intuitively, a random predictor will produce ppl that is equal to the cardinality of vocabulary |V|. However, the EHR records have a different structure from the natural language. Codes are multi-modal and those within the same admission are not ordered. This approach is adapted to the longitudinal imputation perplexity and cross-modality imputation perplexity taking the structure of EHRs into account.

Longitudinal Imputation Perplexity: For accurate generation, the model should capture the temporal coherence of the patient conditions. For instance, some chronic diseases like diabetes can cause complications (e.g., heart disease and kidney failure) in the future. Following Equation (3), the longitudinal imputation perplexity (lpl) of a patient's records $X=\{x_1, \ldots, x_T\}$ can be written as:

$$lpl = e^{-\sum_{t=1}^{T} \log P(x_t|x_{1:t-1}; \theta)/(l_t * T)} = e^{-\sum_{t=1}^{T} \sum_{l=1}^{l_t} \log P(v_l|x_{1:t-1}; \theta)/(l_t * T)} \quad (4)$$

Here, $x_t = \{v_1, \ldots v_{l_T}\}$ are all codes during the t th admission. Inside this admission, all these codes are conditionally independent, therefore the following decomposition can be used to find the results.

$$P(x_t|x_{1:t-1}; \theta) = \Pi_{l=1}^{l_t} P(v_l|x_{1:t-1}; \theta)$$

Cross-modality Imputation Perplexity: For example, if the patient is diagnosed with fever while the lab tests indicating her high body temperature, acetaminophen is a probable medication given in this admission. In this case, the focus is on the tth admission where the joint distribution of all K modalities is $$P(x_t^1, \ldots, x_t^K|x_{1:t-1}; \theta)$$

A goal is to test the model's cross-modality imputation, i.e.:

$$P(x_t^k|x_t^{1:K\setminus k}, x_{1:t-1}; \theta)$$

The NLL can be written as:

$$NLL_t = -\frac{1}{K}\sum_{k=1}^{K} \log P(x_t^k | x_t^{1:K\setminus k}, x_{1:t-1}; \theta) = -\frac{1}{K}\sum_{k=1}^{K} \frac{1}{l_t^k} \sum_{l=1}^{l_t^k} \log P(v_l | x_t^{1:K\setminus k}, x_{1:t-1}; \theta) \quad (5)$$

Where $l_t^k$ indicates the number codes belonging the k th modality. Next, admissions can be tracked to obtain the final definition of mpl as:

$$mpl = e^{\sum_{t=1}^{T} NLL_t/T} \quad 6)$$

F. Privacy Evaluation

Next is a measurement of the privacy preserving characteristics of sharing the synthetic data generated by the model trained on the true data. Two privacy risks are evaluated: membership inference and attribute inference. The data into the training data $\mathcal{D}_1 = \{X_{n,1:T_n}\}_{n=1}^{N}$ and testing data $\mathcal{D}_2$, and generate synthetic data $\mathcal{D}_S$ with the same length as $\mathcal{D}_1$.

Membership Inference: Attackers could try to infer the membership of the patient records based on the real records they own. Once this membership leaks, attackers can leverage it to infer more sensitive information from the training database. This adversary is based on shadow training. In the first stage, a shadow model $M_{sd}$ is trained on $\mathcal{D}_S$. It tries to mimic the performance of the actual model in terms of longitudinal inference.

In the second stage, a membership inference dataset is built based on $M_{sd}(X)$, where $X \in \tilde{\mathcal{D}}_S \cup \mathcal{D}_2$, where $\tilde{\mathcal{D}}_S$ is a subset of $\mathcal{D}_S$ with the same number as $\mathcal{D}_2$. A model $M_{mi}$: $\mathbb{Y}_{ppl} \mapsto \{0,1\}$ is trained to differentiate whether X comes from $\mathcal{D}_S$ or $\mathcal{D}_2$. The success rate of $M_{mi}$ is evaluated based on identifying $X \in \mathcal{D}_1 \cup \mathcal{D}_2$. The better the adversary $M_{sd}(X)$ and $M_{mi}$ perform on this evaluation, the higher the privacy risk of releasing the synthetic EHRs.

Attribute Inference: This adversary is built based on attackers holding some incomplete real records where several sensitive attributes are missing. The adversary takes advantage of the synthetic data to infer these attributes.

Besides, attackers also hold the prior knowledge of association between the attributes, i.e., given the incomplete individual records, how probable another code appears in expectation, or:

$$P_0(v_l \mid \{v_1, \ldots, v_{l_t}\}_{t=1}^T \backslash v_l)$$

With the prior, the attacker could train an attribute imputation model on the synthetic data $\mathcal{D}_S$, i.e.:

$$P(v_l \mid \{v_1, \ldots, v_{l_t}\}_{t=1}^T \backslash v_l; \theta_I)$$

The attacker could conclude that the code $v_l$ exists when:

$$\log P(v_l \mid \{v_1, \ldots, v_{l_t}\}_{t=1}^T \backslash v_l; \theta_I) - \log P_0(v_l \mid \{v_1, \ldots, v_{l_t}\}_{t=1}^T \backslash v_l) \geq \delta \quad (7)$$

Where $\delta$ is a pre-defined threshold. In experiments, another attribute imputation model is trained on $\mathcal{D}_1$ to approximate the prior knowledge. The success rate of this attack is evaluated and an imputation model trained on the testing set is leveraged for calibration.

V. Experiments

In this section, experiments are designed and performed to answer the following questions.

Q1. How well does PromptEHR perform for EHRs generation compared with the state-of-the-art methods on generation quality?

Q2. What is the level of privacy risk on membership inference and attribute inference of the generated EHRs by PromptEHR?

Q3. Are the synthetic data useful for further predictive modeling in practice?

Q4. How is the generation quality of PromptEHR influenced by the size of training records?

A. Experimental Setup

The MIMIC-III data set was used for training and evaluation. It has 46k patients' records collected from the intensive care unit. The diagnosis, procedure, drug, and lab tests are picked as the target events for generation. All events in the same admission are considered to be contemporaneous. The 46,520 patient records are split into sets of 39,581, 2,301, and 4,633 for the training, validation, and testing, respectively. The data statistics are available in FIG. 6.

The performance of PromptEHR is compared with several baselines:

LSTM+MLP. This is the baseline that leverages LSTM to learn the patient state thus extracting the temporal visit patterns. Based on the state embeddings, MLP layers are able to impute the probability of events within the visit or for the next visit.

LSTM+MedGAN. The original MedGAN is not able to do conditional generation and temporal inference. Similar to the first baseline, LSTM is used for capturing temporal patterns as the inputs for MedGAN. Then, the generator of MedGAN will try to make conditional generation for records as realistic as possible to fool its discriminator.

SynTEG. This is one of the most recent EHR generation methods. It also consists of a state embedding module and a imputation module. It utilizes transformers for temporal dependency learning and conditional Wasserstein GAN with gradient penalty (WGAN-GP) for event inference.

GPT-2. GPT-2 is the LM baseline that only does causal language modeling on EHRs. Then, it is able to do event inference like text generation.

For evaluating generation quality, two perplexity measures are used: longitudinal and cross-modality imputation perplexity. Since perplexity of different patient records vary significantly, the median of perplexity is taken across patients for the sake of stability of the performance estimate.

For evaluating the privacy of PromptEHR, two adversaries are used: membership inference (MI) and attribute inference (AI). In MI, use LSTM+MLP is used as the shadow model to mimic the outputs of PromptEHR. A three-layer MLP is then for predicting the membership. A ROC curve is plotted to evaluate the attack success rate. In AI, an LSTM+MLP is trained on $\mathcal{D}_1$ to approximate the prior and another LSTM+MLP on $\mathcal{D}_S$ as the attribute imputation model. It is the same for the control set.

To test the utility of the synthetic data for downstream predictive healthcare applications, LSTM+MLP was trained on $\mathcal{D}_S/\mathcal{D}_2$ and tested on $\mathcal{D}_2$ to compute the recall @ 20/30.

For all the used LSTM+MLP models, a three-layer bi-directional LSTM with 128 hidden dimensions with one 256-dim MLP layer was used. It was trained with a 1e-4 learning rate by the Adam optimizer. The 12-layer transformer based pretrained GPT-2 is trained with a 1e-5 learning rate and a 1e-4 weight decay by Adam. The architecture and training protocols from the original papers of MedGAN and SynTEG were follows.

In PromptEHR, the pretrained BART-base model was used to build EHR-BART. Adam was used by setting learning rate as 1e-5, weight decay as 1e-4, and batch size as 16. The total training epochs were 50 where the first 3 epochs are warm-up steps. During the training stage, the perplexity computed on the validation set is used to pick the best checkpoint for the testing phase.

All experiments are conducted with an RTX-3090 GPU, 251 GB RAM, and an AMD Ryzen Threadripper 3970X 32-core CPU.

B. Q1: Generation Quality Comparison

The calculated mpl and lpl of all methods are compared in FIG. 7, where it can be witnessed that PromptEHR obtains the best result among all methods. In contrast, LSTM+MedGAN and SynTEG do not gain better test perplexity than the basic LSTM+MLP. The main reason is that their GAN part takes a noise input except for the learned temporal state embeddings to make conditional generation. Although this technique might enhance the diversity of the generated samples, it inevitably undermines the generation quality due to the varying noisy inputs. GPT-2 works better than LSTM+MLP on temporal perplexity crediting to its power in capturing series pattern through transformers.

On the other hand, most methods obtain better mpl than lpl. It is intuitive because models know the additional in-visit information from the other modalities for the target modality imputation, thus making better predictions. However, GPT-2 performs worse in mpl than in lpl. The reason is that GPT-2 is trained with the so-called causal language modeling task where it models the sequence autoregressively. Though this manner works for language, it is sensitive to the order change of events within visits when modeling EHRs, which induces weak inference performance for contemporary events.

Q2: Privacy Preserving Evaluation

Figure 8:
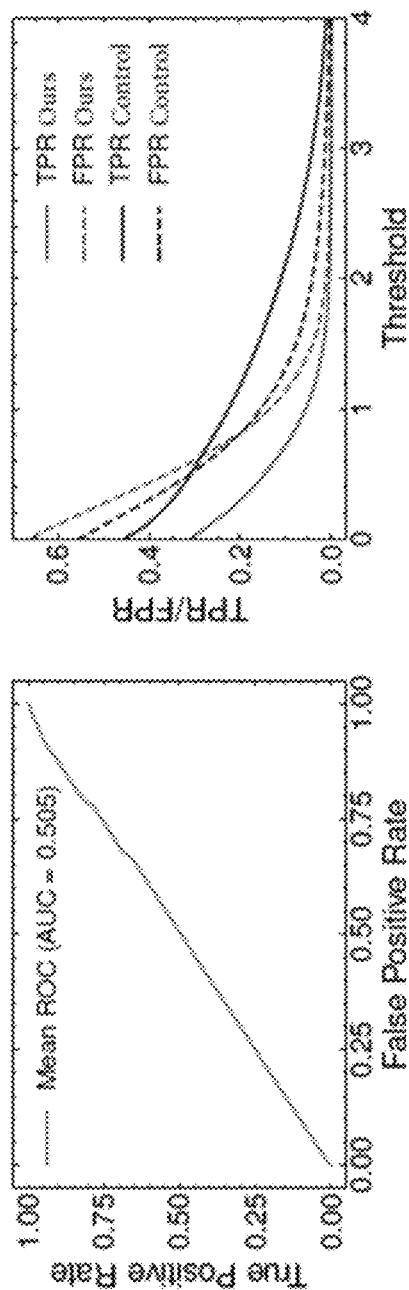
FIG. 8 provides a privacy-preserving evaluation of various models, in accordance with example embodiments.

As aforementioned, the privacy preserving ability of the generated synthetic EHRs are tested by applying membership and attribute inference attacks. Results are provided in FIG. 8. Notably, FIG. 8 provides a privacy-preserving evaluation on membership inference (left) and attribute inference (right) adversaries. On the right, the PromptEHR curves indicate the results of attribute inference model trained on the synthetic data $\mathcal{D}_S$ by PromptEHR; the control curves indicate the one trained on test set $\mathcal{D}_2$.

FIG. 8 part (a) demonstrates the ROC curve consisting of true positive rate (TPR) and false positive rate (FPR) of the membership inference on $\mathcal{D}_1 \cup \mathcal{D}_2$. It clearly shows the MI model has bad performance that is near a random guess (AUC≈0.5), which means the MI attack gains no sensitive membership information when trained on the synthetic data $\mathcal{D}_S$.

FIG. 8 part (b) showcases the TPR/FPR of attribute inference attack based on shadow training with the varying threshold defined in Equation (7). Here, the curve is cut where δ=4 because all the remaining curves are approach zero on its right. The threshold δ adjusts to the confidence level of the attacker, i.e., the smaller δ is set, the higher probability that the AI is correct. When δ=0, so long as the AI inference probability $P(v_l)$ is larger than the prior $P_0(v_l)$, the AI model will believe the attribute $v_l$ exists. In this scenario, both two models have a high FPR of around 0.6, but the TPR of PromptEHR is only near half the control model. The TPR of PromptEHR then keeps a much lower level when δ increases, which implies the low attribute leakage risk of the synthetic data generated by PromptEHR. Although the FPR of PromptEHR becomes smaller than the control when δ>0.8, the TPR of PromptEHR is approaching zero after that. That means, being conservative for PromptEHR avoids inferring some wrong attributes but loses the ability to specify the right attributes at the same time. In a nutshell, the synthetic data by PromptEHR has a low risk to leak the attribute information.

D. Q3: Synthetic EHR Utility

A goal of synthetic EHR generation is to assist the downstream healthcare applications without sharing sensitive real patient records. Now, with the synthetic data at hand, the utility of $\mathcal{D}_S$ by PromptEHR for the sake of one common task in DL for healthcare: the clinical event prediction. An LSTM model is trained on $\mathcal{D}_S$ and $\mathcal{D}_1$, and then used to make multilabel predictions for diagnosis events. LSTM models are evaluated using recall @ 10 and recall @ 20. In detail, two experiments were conducted: (1) training LSTM on fully synthetic data and comparing its performance with the one trained on real data; and (2) training LSTM on a mixture of synthetic data and part of real data where the synthetic data is regarded as a means of data augmentation.

Figure 9:
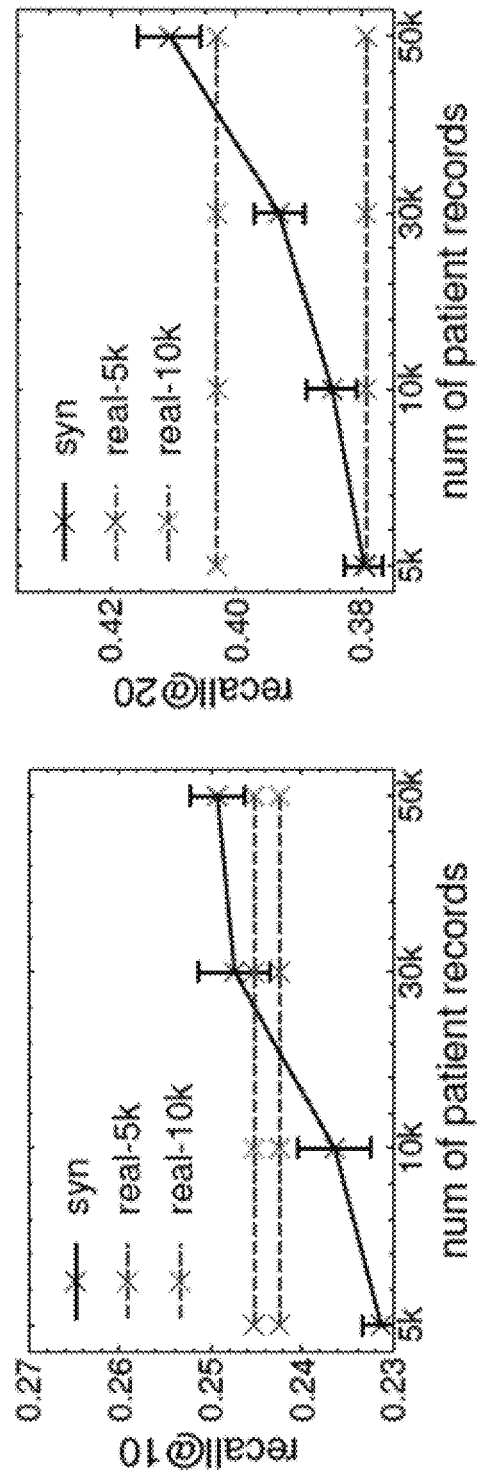
FIG. 9 depicts model performance on synthetic patient records, in accordance with example embodiments.

Fully synthetic data: This is the case where the synthetic data is shared those who have no access to any real EHRs while hoping to develop healthcare applications. The LSTM performance is tested on 5k, 10k, 30k, and 50k synthetic patient records. For comparison, the model performance on 5k and 10k real records are also tested. Results are shown in FIG. 9. Notably, FIG. 9 provides recall @ 10/20 of the predictive model on the test set with varying input data size: syn indicates the model trained on fully synthetic data; real-5k/10k indicate trained on 5k/10k real data. Error bars show the 95% confidence intervals.

For recall @ 10 in FIG. 9 part (a), it is observed that though 10k synthetic records are not comparable to 5k real records, 30k synthetic records can reach a better performance than 10k real records. On the other hand, for recall @ 20 in FIG. 9 part (b), it is established that 5k synthetic records achieve the same performance as the 5k real records.

With more synthetic records involved, the 50k synthetic records-based LSTM outperforms its counterpart on 10k real records at last. This experiment demonstrates that synthetic EHRs by PromptEHR are sufficient to support healthcare applications. Users are expected to achieve comparable performance by using synthetic records as they would if the real data were used.

Figure 10:
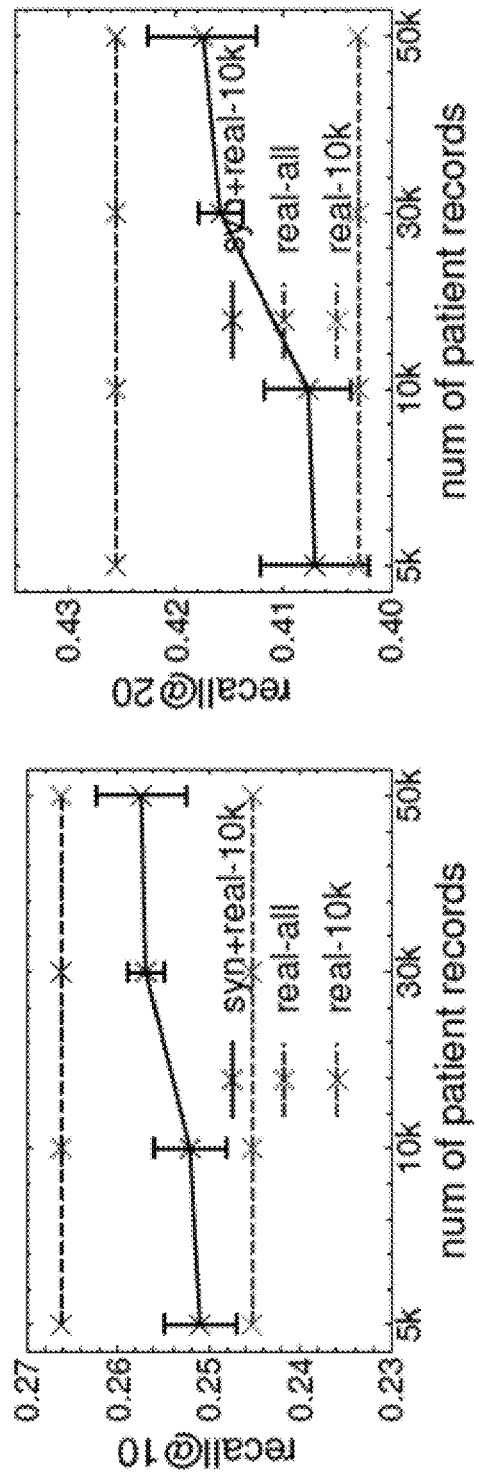
FIG. 10 depicts model performance on hybrid synthetic and real patient records, in accordance with example embodiments.

Hybrid synthetic-real data: To further investigate whether the synthetic records can be a beneficial complement to real records as a means of data augmentation, LSTM was trained on the hybrid synthetic-real data. In FIG. 10, 10k real data was sampled from $\mathcal{D}_1$ and combine them with different sizes of synthetic data from $\mathcal{D}_S$. The model trained on the augmented hybrid data has obvious advantages over its counterpart on the real data. With more synthetic records involved, the model gains better performance. This demonstrates the utility of synthetic data used as augmentation in low-resource cases.

But, from FIG. 10, this hybrid data is still inferior to the model trained on all real records. In FIG. 10, recall @ 10/20 of the predictive model on the test set with varying input data size: syn+real-10k indicates the model trained on the hybrid of synthetic & 10k real data; real-10k/all indicate trained on 10k/all real data. Error bars show the 95% confidence intervals.

So the question remains as to how much synthetic and real data is needed to outperform this apparent upper bound. In other words, can the real data be beaten with enough synthetic data?

Figure 11:
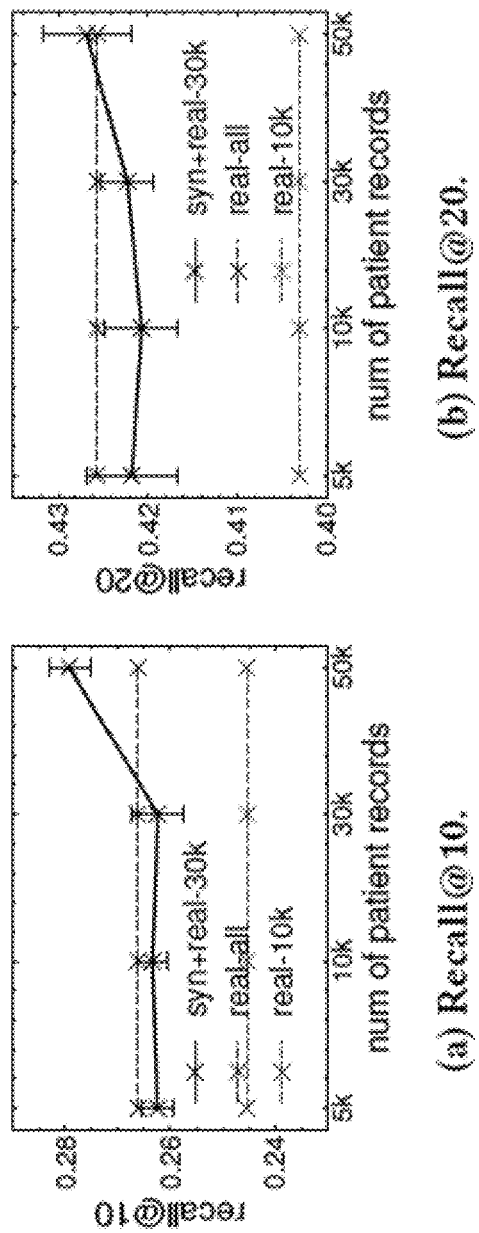
FIG. 11 depicts model performance on hybrid synthetic and real patient records, in accordance with example embodiments.

In the next experiment, 30k real data are combined with synthetic data. Note that there is around 40k real training records in total. Results are shown in FIG. 11. It can be seen that 50k synthetic records combined with 30k real records can outperform the model trained just on all the real training records. Notably, FIG. 11 depicts recall @ 10/20 of the predictive model on the test set with varying input data size: syn+real-30k indicates the model trained on the hybrid of synthetic & 30k real data; real-30k/all indicate trained on 30k/all real data. Error bars show the 95% confidence intervals.

E. Q4: Generation Quality and Training Data Size

Figure 12:
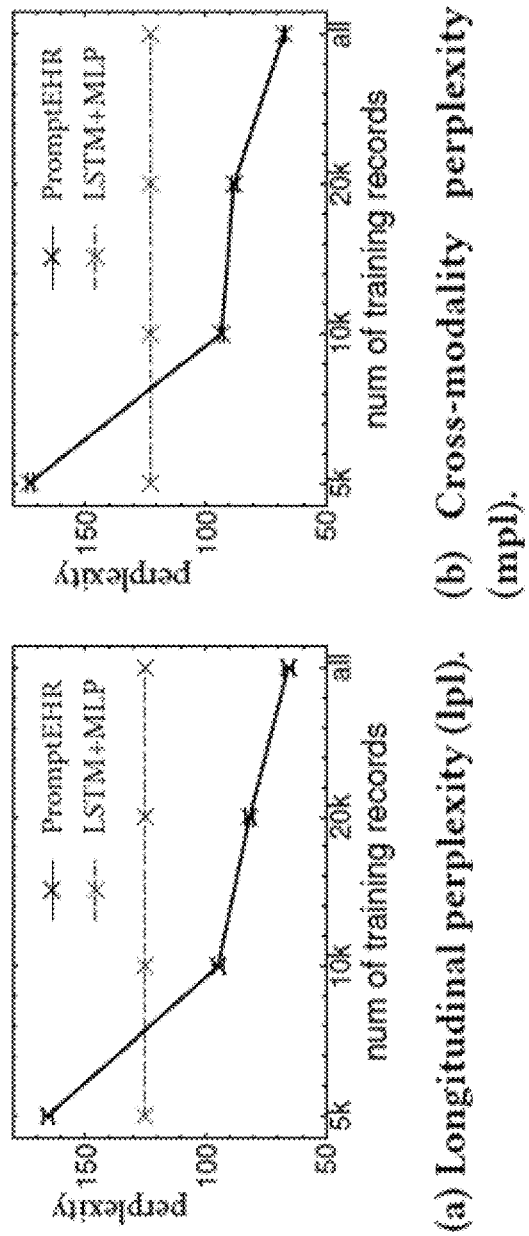
FIG. 12 depicts the spatial and temporal perplexities of PromptEHR with regard to varying input training record sizes, in accordance with example embodiments.

In practice, the original data source to be shared might be in limited size, which elicits a question on how much the generation quality of PromptEHR is influenced by the size of the training cohort. To answer this question, 5k, 10k, and 20k patient records were sampled from the training set and testify the perplexity of the learned PromptEHR. Results are illustrated by FIG. 12. Notably, in FIG. 12, solid lines show the spatial and temporal perplexities of PromptEHR with regard to varying input training record sizes, while dotted lines show the spl and tpl of baseline LSTM+MLP trained on all training records (~40k). Error bars show the 95% confidence intervals The performance of the baseline LSTM+MLP method trained on all real training records (~40k) is plotted in dotted lines for comparison. It can be seen that with 5k training records, PromptEHR has worse generation quality than the baseline. When additional 5k records are involved, PromptEHR not only outperforms the LSTM baseline but also all other baselines reported in FIG. 8, which demonstrates that PromptEHR is amenable to low resources and superior to the baselines.

VI. Case Study

Two randomly picked synthetic patients were generated by PromptEHR, and described in FIGS. 13 and 14. Four types of events are included in the synthetic examples during generation: diagnosis, lab test, procedure, and drug. In general, it is observed that PromptEHR is capable of generating diverse events where events within/across visits evolve in a logical manner.

The first case was generated from scratch (FIG. 13), and it describes a patient who goes into ICU because of a cesarean. During the operation, a test of Hematocrit should be conducted to ensure blood loss of the patient within the safe range. In the second visit, the patient suffers from a bacteria infection. The patient then receives a series of lab tests regarding the inflammation. And spinal tap is performed to help cure serious infections. Antibiotic drugs, e.g., Ampicillin Sodium and Gentamicin, are used to cure the patient. It can be seen that the generated events all center around the same topic (liveborn) and the longitudinal and cross-modal connections are coherent.

The second case was generated based on a real patient EHR by leveraging flexible imputation functions of PromptEHR (FIG. 14). The model scans through the record in time order. For each modality in a visit, it is randomly chosen whether to keep all events, remove all events, or remove a part at random. The imputed events are marked in red. For example, in visit-1, the model takes the diagnosis codes with prompts as inputs and generates the lab tests. Then, the generated lab tests are involved in the input with prompts. In addition, the procedure 'Enteral infusion of nutrition' is also kept in the inputs. The model then generates the remaining procedures in this visit. This process repeats until reaches visit-6 where the real EHR ends.

In general, the events in the second case are coherent under the topic of pneumonia and heart failure. The patient is diagnosed as suffering from pneumonia due to bacteria with many complications like a hemorrhage of gastrointestinal tract, heart failure, and pulmonary collapse. At the same time, procedures like the enteral infusion of nutrition, insertion/replacement of endotracheal tube, and temporary tracheostomy are all included to maintain the patient's life regarding his/her nutrition and breath. Besides this visit, the remaining synthetic visits are also reasonable: he/she gets diagnoses regarding heart failure, respiratory diseases, stomach disorders, etc., which all correspond to relevant issues appearing in the first visit.

These two cases offer an intuitive demonstration of the effectiveness of PromptEHR in generating realistic EHRs, especially when multiple imputation functions are used to generate rather realistic EHRs based on real EHRs, which was hardly mentioned in previous works. Thus, real EHRs can be used to train a prompt learning based generative language model for synthetic EHRs generation, namely PromptEHR. Unlike previous EHRs generation methods, PromptEHR is able to learn from and generate heterogeneous EHRs by both longitudinal and latitudinal inference. Further, experiments on MIMIC-III data demonstrates the quality of generated EHRs are better than the baselines. And the synthetic data provides both utility and privacy for downstream healthcare applications.

VII. Further Embodiments

FIG. 15A-15D provide further descriptions and embodiments in line with the aspects described above. Thus, the disclosure in these figures and this section can be combined with any of these aspects, in part or as a whole.

Figure 15A:
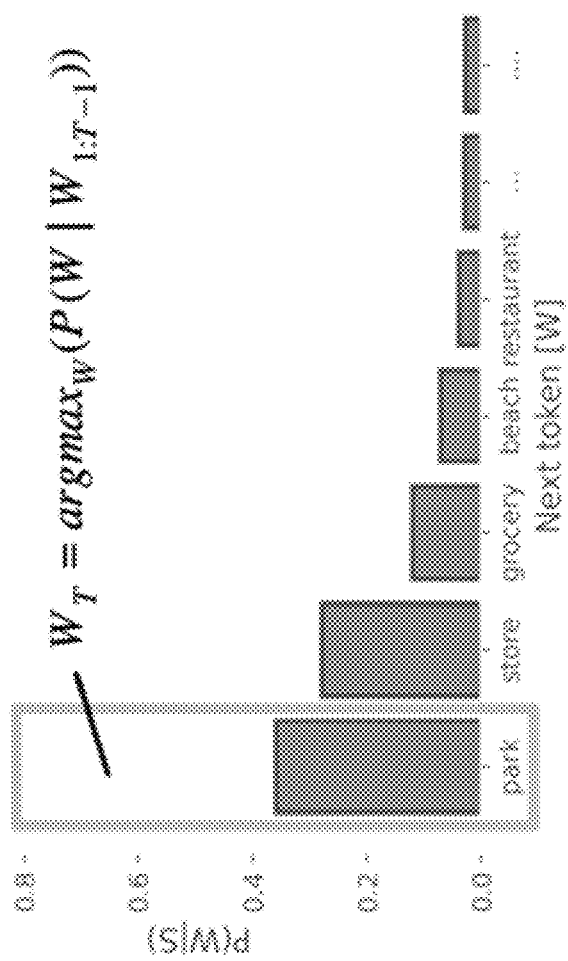
FIGS. 15A, 15B, 15C, and 15D depict further aspects of the PromptEHR language model, in accordance with example embodiments.

Existing language models perform imputation as shown in FIG. 15A in a simple example. The language model is presented with the partial sentence "The boy went to the___" and attempts to fill in the blank with the most likely next word or phrase based a distribution of observed next words and phrases from training data. However, this naïve approach will not work well for EHR generation because EHRs exhibit temporal correlations across multiple modalities (e.g., diagnosis, lab tests, medical procedures performed, drugs prescribed, and so on).

Figure 15B:
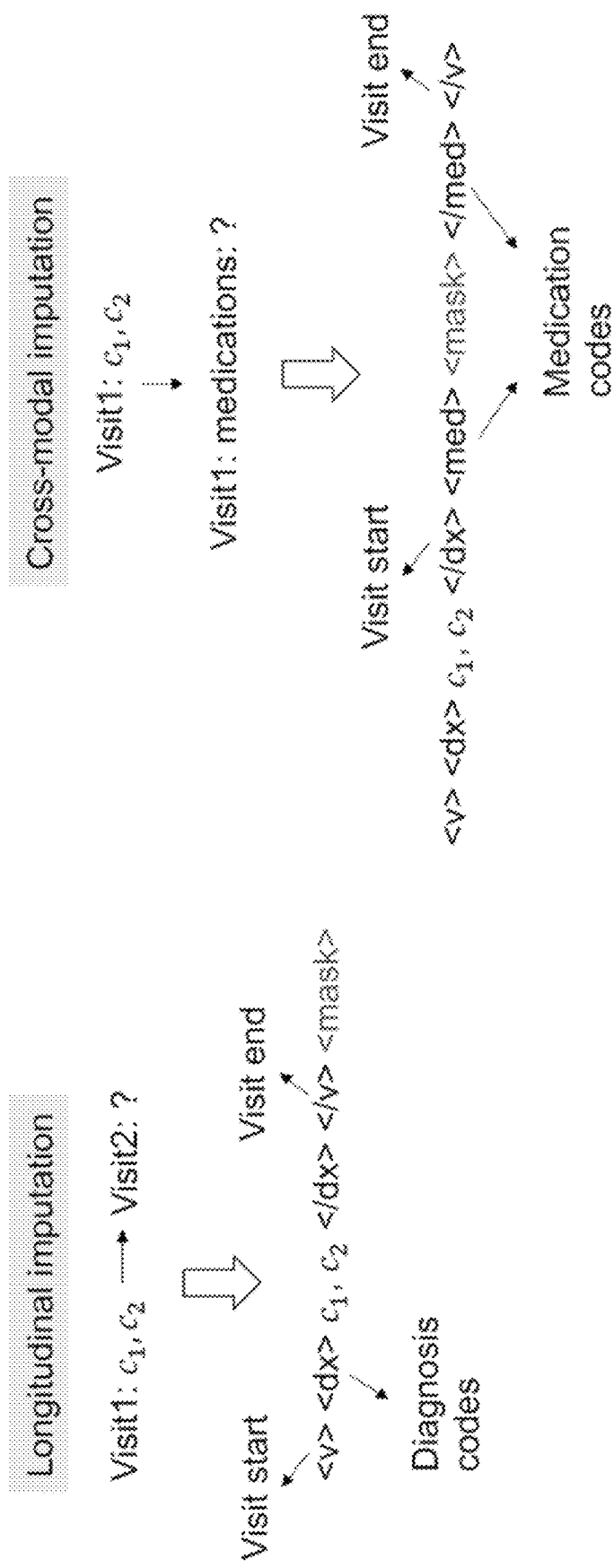

Thus, as shown in FIG. 15B, a goal is to generate EHRs with accurate and representative longitudinal and cross-modal imputations. For the longitudinal imputations, part or all of a synthetic EHR representing a previous or subsequent visit is inferred from one or more existing EHRs (e.g., events $c_1$ and $c_2$ are part of an existing EHR). This can be accomplished by placing a <mask> token before or after an EHR and instructing the language model to replace this token with a sequence of tokens that formulate at least part of an EHR. For the cross-modal imputations, a modality for an EHR can be inferred from one or more existing EHRs (again, events $c_1$ and $c_2$ are part of the existing EHR). This can be accomplished by placing a <mask> token within an EHR and instructing the language model to replace this token with a sequence of tokens that formulate represent a modality. In both cases, the replacement tokens are inferred based on probabilities of such tokens appearing in specific locations of the training data, given the known properties of the provided EHR(s).

Figure 15C:

FIG. 15C depicts conditional longitudinal imputation, where prefix tokens are used to specify input baseline features. In this example, the prefix is that the patient is a newborn female. The language model will then use these prefix tokens to fine-tune its inferences accordingly. In this manner, specific, personalized EHRs can be generated.

Figure 15D:
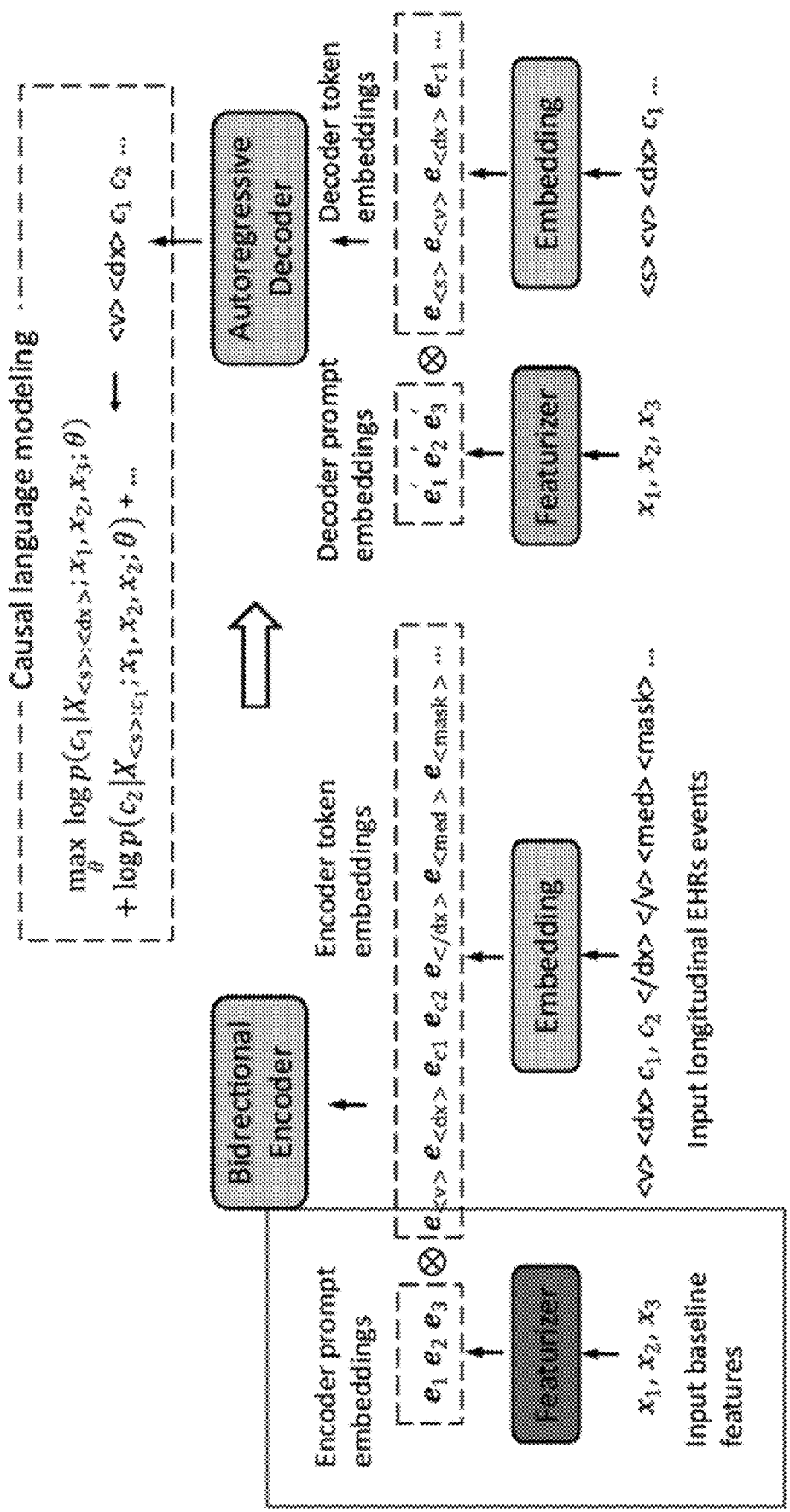

FIG. 15D depicts the overall language model. It has two main parts, a bidirectional language model encoder, and an autoregressive language model decoder. The encoder uses a featurizer to process the prefix tokens (e.g., age, gender, prior medical conditions) into a prefix token vector embedding. The encoder also uses an input model to process a set of one or more longitudinal EHRs (e.g., tokens and masks) into an input vector embedding. These two vector embeddings can be concatenated and provided to the encoder. The encoder may be a series of stacked neural networks that produces a further vector embedding. This further vector embedding is passed to the decoder along with the prefix token vector embedding, and the decoder generates, token by token, a series of synthetic EHRs based thereon.

For training purposes, the language model may also include a loss function that is designed to maximize the log-likelihood of the synthetic EHRs being representative of the ground truth EHRs that were used to train the language model. Based on the results of the loss function, the training of the language model may include updating the encoder and decoder accordingly. When a trained language model is deployed, it may largely consist of the encoder and decoder—the loss function and updating function can be omitted.

VIII. Example Operations

Figure 16:
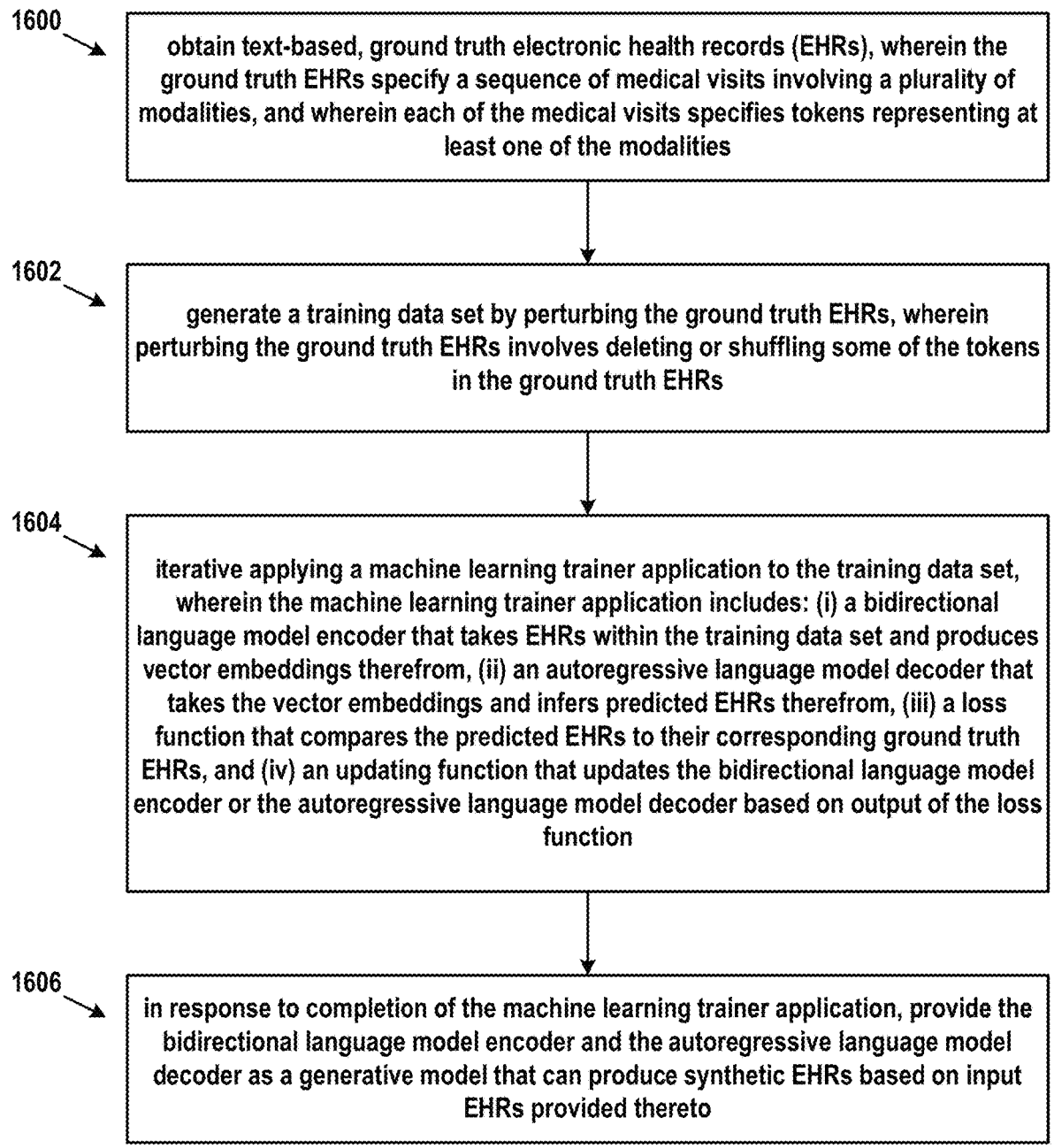
FIG. 16 is a flow chart, in accordance with example embodiments.

FIG. 16 is a flow chart illustrating an example embodiment. The process illustrated by FIG. 16 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 16 may be simplified by the removal of any one or more of the features shown therein. Further, these embodiments may be combined with features, aspects, and/or implementations of any of the previous figures or otherwise described herein.

Block 1600 may involve obtaining text-based, ground truth EHRs, wherein the ground truth EHRs specify a sequence of medical visits involving a plurality of modalities, and wherein each of the medical visits specifies tokens representing at least one of the modalities.

Block 1602 may involve generating a training data set by perturbing the ground truth EHRs, wherein perturbing the ground truth EHRs involves deleting or shuffling some of the tokens in the ground truth EHRs.

Block 1604 may involve iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, (iii) a loss function that compares the predicted EHRs to their corresponding ground truth EHRs, and (iv) an updating function that updates the bidirectional language model encoder or the autoregressive language model decoder based on output of the loss function; and Block 1606 may involve, in response to completion of the machine learning trainer application, providing the bidirectional language model encoder and the autoregressive language model decoder as a generative model that can produce synthetic EHRs based on input EHRs provided thereto.

In some implementations, the plurality of modalities include two or more of a diagnosis modality, a drug modality, a medical procedure modality, or a lab test modality.

In some implementations, the bidirectional language model encoder and the autoregressive language model decoder also each take a prefix token vector embedding concatenated, wherein the prefix token vector embedding specifies one or more characteristics of a patient for which the predicted EHRs are to be generated.

In some implementations, deleting some of the tokens in the ground truth EHRs comprises removing some of the tokens from the ground truth EHRs.

In some implementations, deleting some of the tokens in the ground truth EHRs comprises replacing some of the tokens in the ground truth EHRs with a mask token that indicates where one or more tokens are to be generated.

In some implementations, shuffling some of the tokens in the ground truth EHRs comprises randomly reordering the tokens in the ground truth EHRs.

In some implementations, each iteration of training performed by the machine learning trainer application includes randomly masking tokens representing a specific modality of the plurality of modalities.

In some implementations, the loss function determines a difference between the predicted EHRs and their corresponding ground truth EHRs.

In some implementations, the updating function updates the bidirectional language model encoder or the autoregressive language model decoder based on the difference.

Some implementations may further involve: providing, to the generative model, a new set of EHRs; and receiving, from the generative model, a further set of EHRs with tokens based on the new set of EHRs and the bidirectional language model encoder and the autoregressive language model decoder as trained.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example.

The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining text-based, ground truth electronic health records (EHRs), wherein the ground truth EHRs specify a sequence of medical visits involving a plurality of modalities, and wherein each of the medical visits specifies tokens representing at least one of the modalities;
    generating a training data set by perturbing the ground truth EHRs, wherein perturbing the ground truth EHRs involves deleting or shuffling some of the tokens in the ground truth EHRs;
    iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, (iii) a loss function that compares the predicted EHRs to their corresponding ground truth EHRs, and (iv) an updating function that updates the bidirectional language model encoder or the autoregressive language model decoder based on output of the loss function; and
    in response to completion of the machine learning trainer application, providing the bidirectional language model encoder and the autoregressive language model decoder as a generative model that can produce synthetic EHRs based on input EHRs provided thereto;
    producing, by way of the generative model, a privacy-preserving synthetic EHR; and
    providing the privacy-preserving synthetic EHR to a downstream healthcare application.

2. The computer-implemented method of claim 1, wherein the plurality of modalities include two or more of a diagnosis modality, a drug modality, a medical procedure modality, or a lab test modality.

3. The computer-implemented method of claim 1, wherein the bidirectional language model encoder and the autoregressive language model decoder also each take a prefix token vector embedding, wherein the prefix token vector embedding specifies one or more characteristics of a patient for which the predicted EHRs are to be generated.

4. The computer-implemented method of claim 1, wherein deleting some of the tokens in the ground truth EHRs comprises removing some of the tokens from the ground truth EHRs.

5. The computer-implemented method of claim 1, wherein deleting some of the tokens in the ground truth EHRs comprises replacing some of the tokens in the ground truth EHRs with a mask token that indicates where one or more tokens are to be generated.

6. The computer-implemented method of claim 1, wherein shuffling some of the tokens in the ground truth EHRs comprises randomly reordering the tokens in the ground truth EHRs.

7. The computer-implemented method of claim 1, wherein each iteration of training performed by the machine learning trainer application includes randomly masking tokens representing a specific modality of the plurality of modalities.

8. The computer-implemented method of claim 1, wherein the loss function determines a difference between the predicted EHRs and their corresponding ground truth EHRs.

9. The computer-implemented method of claim 8, wherein the updating function updates the bidirectional language model encoder or the autoregressive language model decoder based on the difference.

10. The computer-implemented method of claim 1, further comprising:
    providing, to the generative model, a new set of EHRs; and
    receiving, from the generative model, a further set of EHRs with tokens based on the new set of EHRs and the bidirectional language model encoder and the autoregressive language model decoder as trained.

11. A non-transitory computer-readable medium, having stored thereon program instructions that, upon execution by a computing system, cause the computing system to perform operations comprising:
    obtaining text-based, ground truth electronic health records (EHRs), wherein the ground truth EHRs specify a sequence of medical visits involving a plurality of modalities, and wherein each of the medical visits specifies tokens representing at least one of the modalities;
    generating a training data set by perturbing the ground truth EHRs, wherein perturbing the ground truth EHRs involves deleting or shuffling some of the tokens in the ground truth EHRs;
    iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, (iii) a loss function that compares the predicted EHRs to their corresponding ground truth EHRs, and (iv) an updating function that updates the bidirectional language model encoder or the autoregressive language model decoder based on output of the loss function; and
    in response to completion of the machine learning trainer application, providing the bidirectional language model encoder and the autoregressive language model decoder as a generative model that can produce synthetic EHRs based on input EHRs provided thereto;
    producing, by way of the generative model, a privacy-preserving synthetic EHR; and providing the privacy-preserving synthetic EHR to a downstream healthcare application.

12. The non-transitory computer-readable medium of claim 11, wherein the bidirectional language model encoder and the autoregressive language model decoder also each take a prefix token vector embedding, wherein the prefix token vector embedding specifies one or more characteristics of a patient for which the predicted EHRs are to be generated.

13. The non-transitory computer-readable medium of claim 11, wherein deleting some of the tokens in the ground truth EHRs comprises removing some of the tokens from the ground truth EHRs.

14. The non-transitory computer-readable medium of claim 11, wherein deleting some of the tokens in the ground truth EHRs comprises replacing some of the tokens in the ground truth EHRs with a mask token that indicates where one or more tokens are to be generated.

15. The non-transitory computer-readable medium of claim 11, wherein shuffling some of the tokens in the ground truth EHRs comprises randomly reordering the tokens in the ground truth EHRs.

16. The non-transitory computer-readable medium of claim 11, wherein each iteration of training performed by the machine learning trainer application includes randomly masking tokens representing a specific modality of the plurality of modalities.

17. The non-transitory computer-readable medium of claim 11, wherein the loss function determines a difference between the predicted EHRs and their corresponding ground truth EHRs.

18. The non-transitory computer-readable medium of claim 17, wherein the updating function updates the bidirectional language model encoder or the autoregressive language model decoder based on the difference.

19. The non-transitory computer-readable medium of claim 11, the operations further comprising:
   providing, to the generative model, a new set of EHRs; and
   receiving, from the generative model, a further set of EHRs with tokens based on the new set of EHRs and the bidirectional language model encoder and the autoregressive language model decoder as trained.

20. A computing device comprising:
one or more processors;
memory; and
program instructions, stored in the memory, that upon execution by the one or more processors cause the computing device to perform operations comprising:
   obtaining text-based, ground truth electronic health records (EHRs), wherein the ground truth EHRs specify a sequence of medical visits involving a plurality of modalities, and wherein each of the medical visits specifies tokens representing at least one of the modalities;
   generating a training data set by perturbing the ground truth EHRs, wherein perturbing the ground truth EHRs involves deleting or shuffling some of the tokens in the ground truth EHRs;
   iteratively applying a machine learning trainer application to the training data set, wherein the machine learning trainer application includes: (i) a bidirectional language model encoder that takes EHRs within the training data set and produces vector embeddings therefrom, (ii) an autoregressive language model decoder that takes the vector embeddings and infers predicted EHRs therefrom, (iii) a loss function that compares the predicted EHRs to their corresponding ground truth EHRs, and (iv) an updating function that updates the bidirectional language model encoder or the autoregressive language model decoder based on output of the loss function; and
   in response to completion of the machine learning trainer application, providing the bidirectional language model encoder and the autoregressive language model decoder as a generative model that can produce synthetic EHRs based on input EHRs provided thereto;
   producing, by way of the generative model, a privacy-preserving synthetic EHR; and
   providing the privacy-preserving synthetic EHR to a downstream healthcare application.

* * * * *